US012598588B2

(12) United States Patent
Chen et al.

(10) Patent No.: US 12,598,588 B2
(45) Date of Patent: Apr. 7, 2026

(54) MULTIPLE SUPPLEMENTAL UPLINK (SUL) CARRIERS

(71) Applicant: QUALCOMM Incorporated, San Diego, CA (US)

(72) Inventors: Bo Chen, Beijing (CN); Wentao Zhang, Beijing (CN); Mingkai Nan, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 504 days.

(21) Appl. No.: 18/004,396

(22) PCT Filed: Aug. 27, 2020

(86) PCT No.: PCT/CN2020/111635
§ 371 (c)(1),
(2) Date: Jan. 5, 2023

(87) PCT Pub. No.: WO2022/041028
PCT Pub. Date: Mar. 3, 2022

(65) Prior Publication Data
US 2023/0276410 A1 Aug. 31, 2023

(51) Int. Cl.
*H04W 72/02* (2009.01)
*H04L 5/00* (2006.01)
*H04W 72/0453* (2023.01)

(52) U.S. Cl.
CPC ........... *H04W 72/02* (2013.01); *H04L 5/0094* (2013.01); *H04W 72/0453* (2013.01)

(58) Field of Classification Search
CPC . H04W 72/02; H04W 72/0453; H04W 72/23; H04W 72/569; H04W 72/1268;
(Continued)

(56) References Cited

U.S. PATENT DOCUMENTS

2019/0215749 A1 7/2019 Shih et al.
2019/0268912 A1* 8/2019 Myung ................. H04L 1/1887
(Continued)

FOREIGN PATENT DOCUMENTS

CN 109728887 A 5/2019
CN 109729595 A 5/2019
(Continued)

OTHER PUBLICATIONS

China Telecom: "Updated Procedure for Adding SUL Bands", 3GPP TSG-RAN WG4 Meeting NR#3, R4-1710035, Nagoya, Japan, Sep. 18, 2017-Sep. 21, 2017, pp. 1-4, Sep. 21, 2017 (Sep. 21, 2017) the whole document.

(Continued)

*Primary Examiner* — Thai Nguyen
(74) *Attorney, Agent, or Firm* — Norton Rose Fulbright US LLP

(57) ABSTRACT

This disclosure provides systems, methods, and devices for wireless communication that support use of a supplemental uplink (SUL) carrier. In a first aspect, a user equipment (UE) is configured to receive, from a base station, a carrier set configuration indicating multiple uplink (UL) carriers. The multiple UL carriers include multiple SUL carriers and a non-SUL carrier. The UE is further configured to select one or more carriers of the multiple UL carriers, and transmit a channel on each carrier of the one or more carriers. Other aspects and features are also claimed and described.

25 Claims, 7 Drawing Sheets

(58) Field of Classification Search
     CPC ... H04W 74/006; H04W 72/21; H04W 36/18;
            H04L 5/0094; H04L 5/001; H04L 5/0023;
                                      H04L 5/0055
     See application file for complete search history.

(56) References Cited

U.S. PATENT DOCUMENTS

| | | | |
|---|---|---|---|
| 2020/0107369 A1* | 4/2020 | Jeon .................... | H04W 74/006 |
| 2020/0260265 A1* | 8/2020 | Jin .......................... | H04W 8/24 |
| 2020/0281023 A1* | 9/2020 | Yan ....................... | H04L 5/0094 |

FOREIGN PATENT DOCUMENTS

| | | | | | |
|---|---|---|---|---|---|
| CN | 110035543 A | * | 7/2019 | ............ | H04W 72/12 |
| CN | 110324886 A | * | 10/2019 | .......... | H04W 52/146 |
| GB | 2567001 A | * | 4/2019 | ............ | H04W 36/08 |

OTHER PUBLICATIONS

International Search Report and Written Opinion—PCT/CN2020/111635—ISA/EPO—May 31, 2021.

* cited by examiner

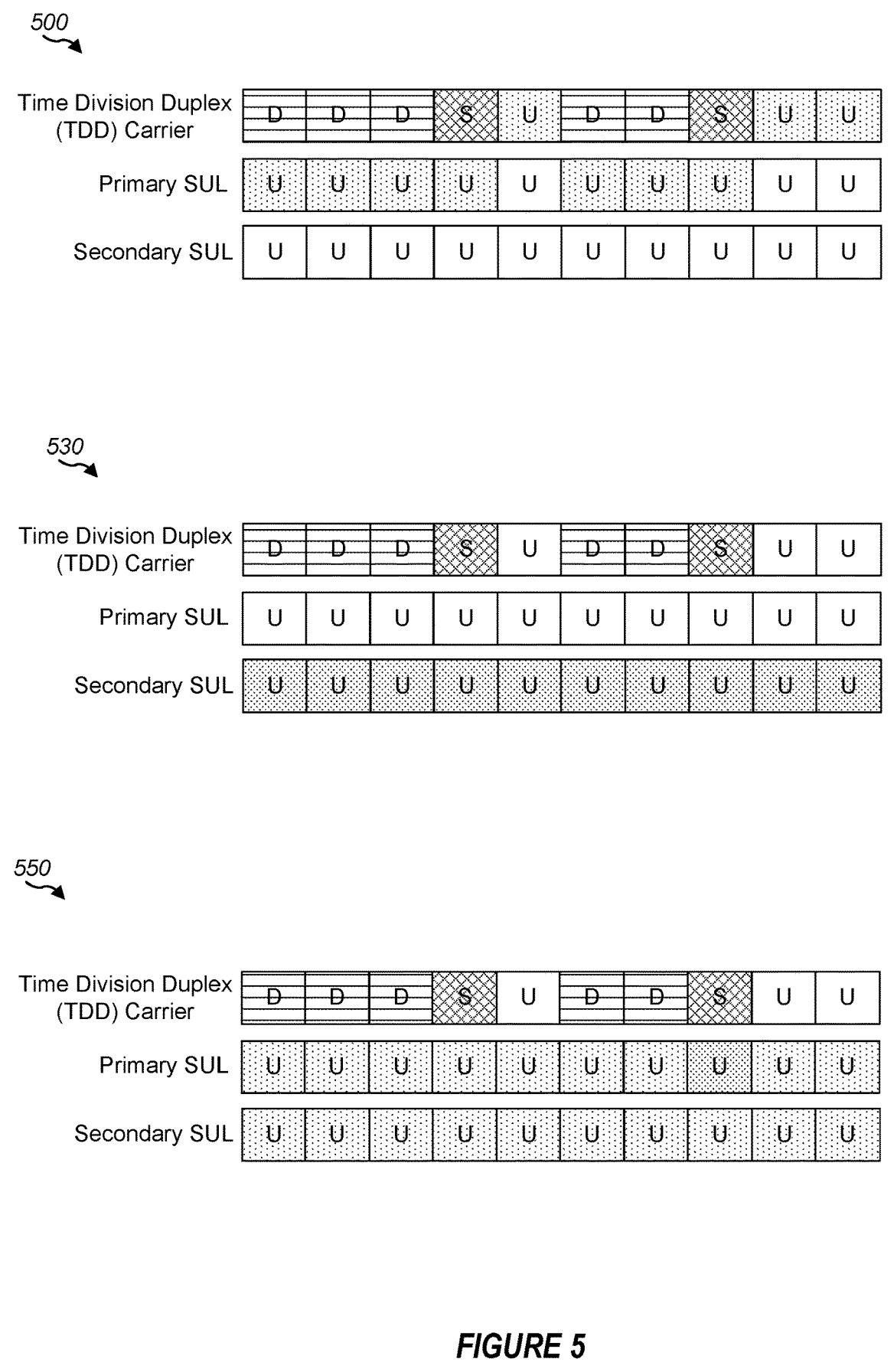

_500_

| Time Division Duplex (TDD) Carrier | D | D | D | S | U | D | D | S | U | U |
| Primary SUL | U | U | U | U | U | U | U | U | U | U |
| Secondary SUL | U | U | U | U | U | U | U | U | U | U |

_530_

| Time Division Duplex (TDD) Carrier | D | D | D | S | U | D | D | S | U | U |
| Primary SUL | U | U | U | U | U | U | U | U | U | U |
| Secondary SUL | U | U | U | U | U | U | U | U | U | U |

_550_

| Time Division Duplex (TDD) Carrier | D | D | D | S | U | D | D | S | U | U |
| Primary SUL | U | U | U | U | U | U | U | U | U | U |
| Secondary SUL | U | U | U | U | U | U | U | U | U | U |

FIGURE 5

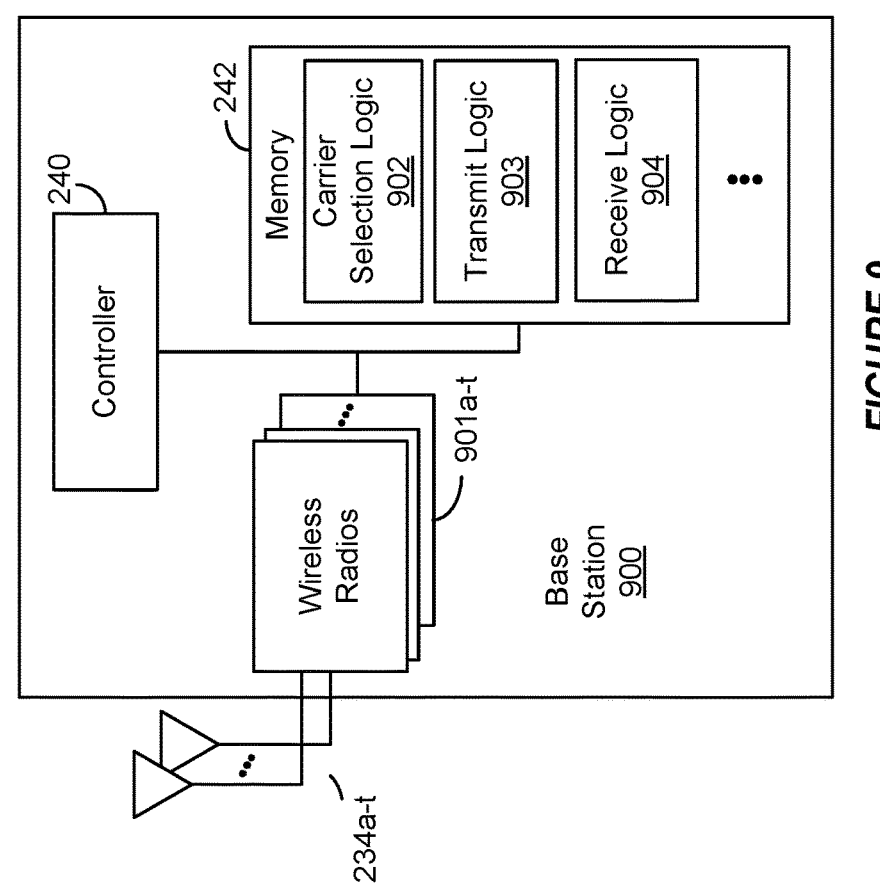

FIGURE 9

Base Station 900

Controller 240

Memory 242

Carrier Selection Logic 902

Transmit Logic 903

Receive Logic 904

Wireless Radios 901a-t 234a-t

---

800

Transmit, to a user equipment (UE), a carrier set configuration indicating multiple uplink (UL) carriers, the multiple UL carriers including multiple supplemental uplink (SUL) carriers and a non-SUL carrier          802

Select one or more carriers of the multiple UL carriers          804

Receive, from the UE, a channel on each carrier of the one or more carriers          806

FIGURE 8

MULTIPLE SUPPLEMENTAL UPLINK (SUL) CARRIERS

CROSS-REFERENCE TO RELATED APPLICATIONS

This application claims the benefit of International Patent Application No. PCT/CN2020/111635, entitled, "MULTIPLE SUPPLEMENTAL UPLINK (SUL) CARRIERS," filed on Aug. 27, 2020, which is expressly incorporated by reference herein in its entirety.

TECHNICAL FIELD

Aspects of the present disclosure relate generally to wireless communication systems, and more particularly, to use of a supplemental uplink (SUL) carrier, such as multiple SUL carriers.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Wireless communication systems typically support uplink (UL) communications from a UE to a base station and downlink (DL) communications from the base station to the UE. UL communications may be more susceptible to fading and attenuation due to the UE having a less powerful transmitter than the base station, and thus UL communications typically may have a shorter range than DL communications. The shorter range of the UL communications may be more pronounced for communications in higher frequency bands, such as the millimeter wave band. To extend UL communication range, some wireless communication systems support UL communications in a cell on a UL carrier and a supplementary uplink (SUL) carrier. The SUL carrier may be a carrier within the same cell that is allocated to lower frequencies than the UL carrier. In some wireless communication systems that support both a UL carrier (also referred to herein as a "normal UL carrier" or a "non-SUL carrier") and a SUL carrier, the UE may use the SUL to extend the UL communication range (e.g., a cell edge coverage). However, use of the SUL carrier may be limited in extending the UL communication range, limited in peak throughput, or a combination thereof. For example, different devices may have different capabilities to support use of the SUL carrier, such as a UE that is limited to use of a single SUL (e.g., a single antenna Tx), which may have a narrow band and a low rank. Additionally, changing network conditions or interference may limit a UL communication range of the SUL or a peak UL throughput. Accordingly, conventional use of a UL carrier and a SUL carrier is limited in extending extend the UL communication range or increasing a peak throughput of a wireless communication system.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method of wireless communication performed by a user equipment (UE). The method includes receiving, from a base station, a carrier set configuration indicating multiple uplink (UL) carriers. The multiple UL carriers include multiple supplemental uplink (SUL) carriers and a non-SUL carrier. The method further includes selecting one or more carriers of the multiple UL carriers, and transmitting a channel on each carrier of the one or more carriers.

Another innovative aspect of the subject matter described in this disclosure can be implemented in a UE. The UE includes at least one processor and a memory coupled with the at least one processor and storing processor-readable instructions that, when executed by the at least one processor, is configured to receive, from a base station, a carrier set configuration indicating multiple UL carriers. The multiple UL carriers include multiple SUL carriers and a non-SUL carrier. The processor-readable instructions are further configured to select one or more carriers of the multiple UL carriers, and initiate transmission of a channel on each carrier of the one or more carriers.

Another innovative aspect of the subject matter described in this disclosure can be implemented in an apparatus configured for wireless communication. The apparatus includes means for receiving, from a base station, a carrier set configuration indicating multiple UL carriers. The multiple UL carriers include multiple SUL carriers and a non-SUL carrier. The apparatus also includes means for selecting one or more carriers of the multiple UL carriers, and means for transmitting a channel on each carrier of the one or more carriers.

Another innovative aspect of the subject matter described in this disclosure can be implemented in a non-transitory computer-readable medium storing instructions that, when executed by a processor, cause the processor to perform operations including receiving, from a base station, a carrier set configuration indicating multiple UL carriers. The multiple UL carriers include multiple SUL carriers and a non-SUL carrier. The operations further include selecting one or more carriers of the multiple UL carriers, and initiating transmission of a channel on each carrier of the one or more carriers.

Another innovative aspect of the subject matter described in this disclosure can be implemented in an apparatus configured for wireless communication. The apparatus includes an interface configured for wireless communication and a processor system coupled to the interface. The interface is configured to receive, from a base station, a carrier set configuration indicating multiple UL carriers. The multiple UL carriers include multiple SUL carriers and a non-SUL carrier. The processor system is configured to select one or more carriers of the multiple UL carriers. The interface is further configured to transmit a channel on each carrier of the one or more carriers.

Another innovative aspect of the subject matter described in this disclosure can be implemented in a method of wireless communication performed by a base station. The method includes transmitting, to a UE, a carrier set configuration indicating multiple UL carriers. The multiple UL carriers include multiple SUL carriers and a non-SUL carrier. The method further includes selecting one or more carriers of the multiple UL carriers, and receiving, from the UE, a channel on each carrier of the one or more carriers.

Another innovative aspect of the subject matter described in this disclosure can be implemented in a base station. The base station includes at least one processor and a memory coupled with the at least one processor and storing processor-readable instructions that, when executed by the at least one processor, is configured to initiate transmission, to a UE, of a carrier set configuration indicating multiple UL carriers. The multiple UL carriers include multiple SUL carriers and a non-SUL carrier. The processor-readable instructions are further configured to select one or more carriers of the multiple UL carriers, and receive, from the UE, a channel on each carrier of the one or more carriers.

Another innovative aspect of the subject matter described in this disclosure can be implemented in an apparatus configured for wireless communication. The apparatus includes means for transmitting, to a UE, a carrier set configuration indicating multiple UL carriers. The multiple UL carriers include multiple SUL carriers and a non-SUL carrier. The apparatus also includes means for selecting one or more carriers of the multiple UL carriers, and means for receiving, from the UE, a channel on each carrier of the one or more carriers.

Another innovative aspect of the subject matter described in this disclosure can be implemented in a non-transitory computer-readable medium storing instructions that, when executed by a processor, cause the processor to perform operations including initiating transmission, to a UE, of a carrier set configuration indicating multiple UL carriers. The multiple UL carriers include multiple SUL carriers and a non-SUL carrier. The operations further include selecting one or more carriers of the multiple UL carriers, and receiving, from the UE, a channel on each carrier of the one or more carriers.

Another innovative aspect of the subject matter described in this disclosure can be implemented in an apparatus configured for wireless communication. The apparatus includes an interface configured for wireless communication and a processor system coupled to the interface. The interface is configured to transmit, to a UE, a carrier set configuration indicating multiple UL carriers. The multiple UL carriers include multiple SUL carriers and a non-SUL carrier. The processor system is configured to select one or more carriers of the multiple UL carriers. The interface is further configured to receive, from the UE, a channel on each carrier of the one or more carriers.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a diagram of examples of a time division duplex (TDD) carrier and one or more SUL carriers according to some aspects of the present disclosure.

FIG. 8 is a flow diagram illustrating an example process that supports multiple SUL carriers according to some aspects of the present disclosure.

FIG. 9 is a block diagram of an example base station that supports multiple SUL carriers according to some aspects of the present disclosure.

Like reference numbers and designations in the various drawings indicate like elements.

DETAILED DESCRIPTION

Figure 1:
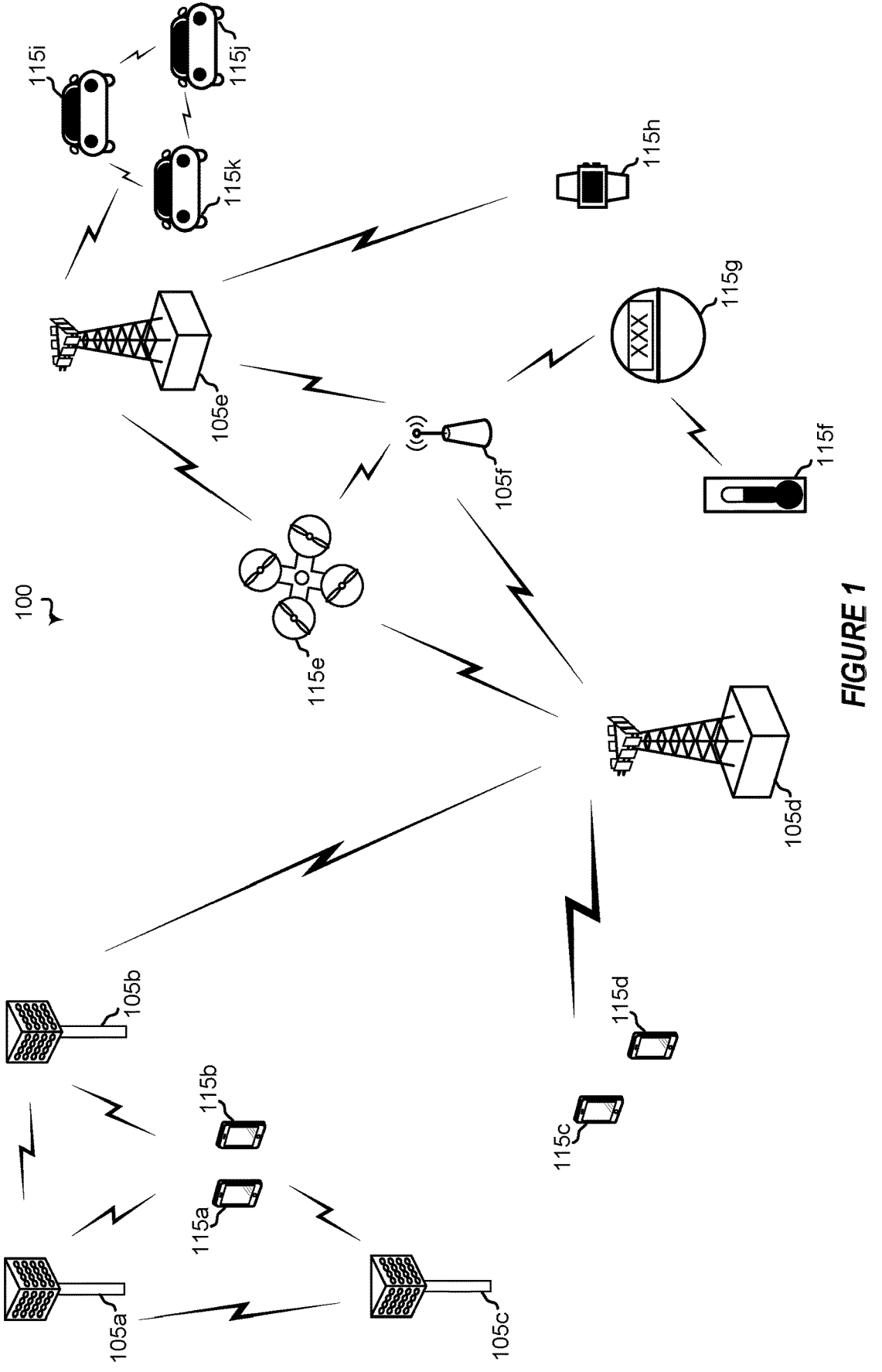
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media for supporting multiple SUL carriers for use in transmission of UL messages by a UE. The techniques of the present disclosure may provide a wireless communication system that supports a UL carrier, such as a non-SUL carrier, and multiple SUL carriers for UL communications from the UE to a base station. The UL carrier and the multiple SUL carriers may be carriers of a same cell (e.g., a primary cell) supported by the base station, with the multiple SUL carriers being allocated to frequency resources having lower frequency than the frequency resources to which the UL carrier (e.g., the non-SUL carrier) is allocated. For example, the multiple SUL carriers may be associated with a 2.3 gigahertz (GHz) band, a 700 megahertz (MHz) band, or a combination thereof. The multiple SUL carriers may include a first SUL carrier, such as a primary SUL (pSUL) carrier, and a second SUL carrier, such as one or more secondary SUL (sSUL) carriers. The base station may determine and indicate a configuration of the UL carrier and the multiple carriers and may schedule the UE to use one or more carriers of the UL carrier and the multiple carriers. The UE may transmit a resource, such as a physical uplink shared channel (PUSCH) or a physical uplink control channel (PUCCH), via each of the one or more carrier. The UE may be configured to use the multiple SUL carriers by a base station may be scheduled to use one or more of the multiple SUL carriers.

To illustrate, the UE may transmit capability information to the base station. The capability information may indicate one or more carriers supported by the UE, a concurrent transmission via multiple carriers capability, a transmit power capability, a number of antenna, the like, or a combination thereof. The base station may determine a group of carriers that includes a UL carrier and a multiple SUL carriers and transmit an indication of the group of carriers to the UE. In some implementations, the indication of the group of carriers may further indicate a first SUL carrier of the multiple SUL carriers as a pSUL carrier, a second SUL carrier of the multiple SUL carriers a first sSUL carrier, a third SUL carrier of the multiple SUL carries as a second sSUL carrier, or a combination thereof. Additionally, the base station may select one or more carriers, from the group of carriers, for use by the UE in transmitting a UL message, such as PUSCH or PUCCH. For example, the base station may select the one or more carriers based on the capabilities of the UE, measurements performed by the base station, measurements received from the UE, one or more other techniques, or a combination thereof. The base station may send a message indicating the one or more carriers to the UE. The base station may indicate the group of carriers and the one or more carriers in the same message or in different messages. In some implementations, the base station may send one or more bits, such as a bit map, index value, or mapping value, to indicate a carrier of the group of carriers for the UE to use. Additionally, or alternatively, the base station may semi-statically or dynamically indicate the indicate the one or more carriers to the UE. The UE may transmit a UL message to the base station via the one or more carriers. For example, the one or more carriers may include the UL carrier (e.g., a non-SUL carrier), the first SUL, the second SUL, the third SUL, or a combination thereof. In some implementations, the UE may concurrently transmit the UL message via two or more carriers.

Particular implementations of the subject matter described in this disclosure can be implemented to realize one or more of the following potential advantages. In some aspects, the present disclosure provides an increased uplink coverage. For example, selective use of one or more SUL carriers may increase the UL transmission range of the wireless communication system, especially for wireless communication systems that support communications in higher frequencies, such as the millimeter wave band. Additionally, or alternatively, the present disclosure provides an increased uplink throughput (e.g., a peak through put) for the cell. For example, use of multiple SULs may increase the throughput of the wireless communication system, such as for the cell edge. Additionally, or alternatively, the selection or switching of the one or more carriers for transmitting the UL messages may provide more flexibility and more frequency diversity within the wireless communication system, which may reduce the effects of dynamic interference or jamming on UL transmissions.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD/TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHZ, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (MTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115c, which is a drone. Redundant communication links with UE 115e include from macro base stations 105d and 105c, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105c, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105c.

Figure 2:
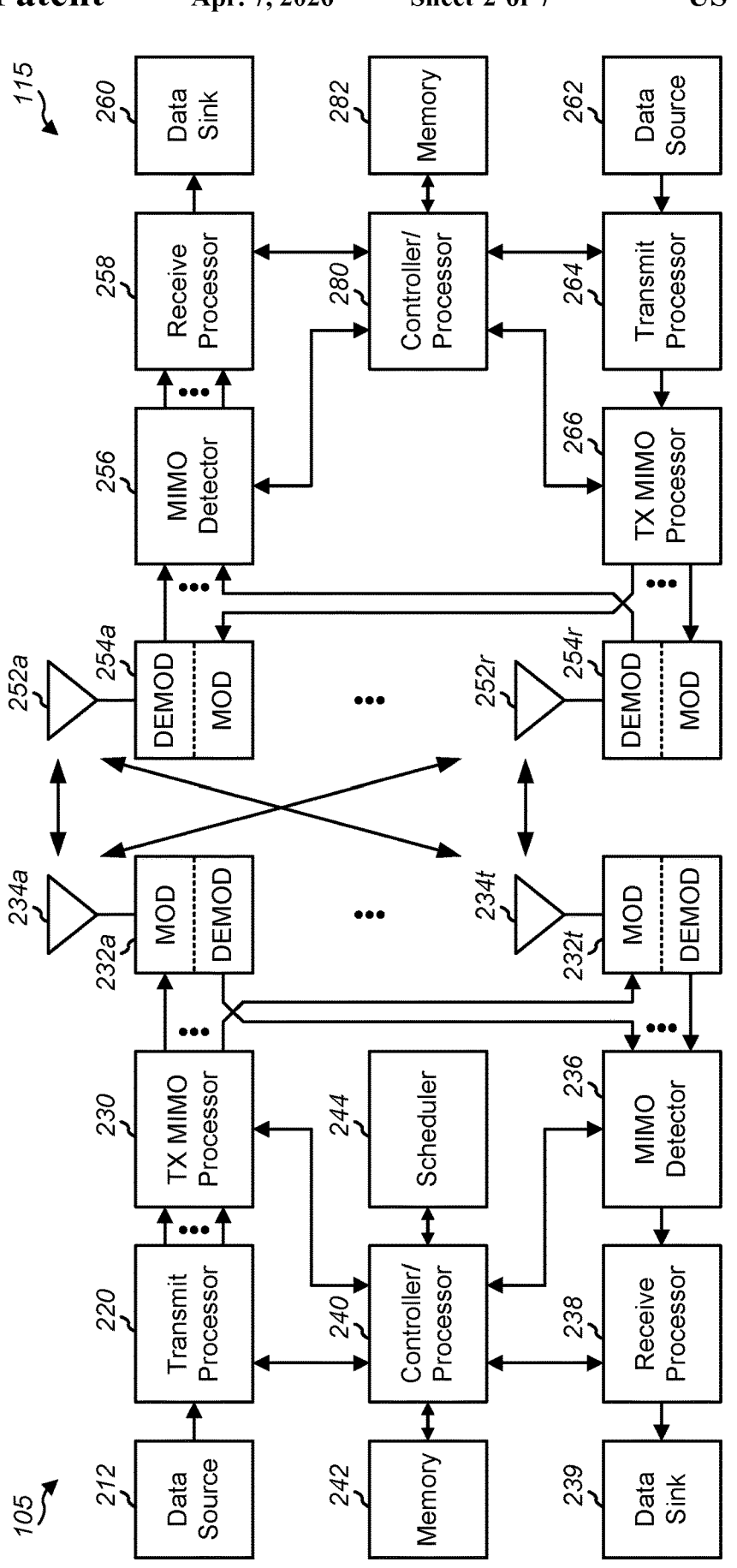
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 1-9, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
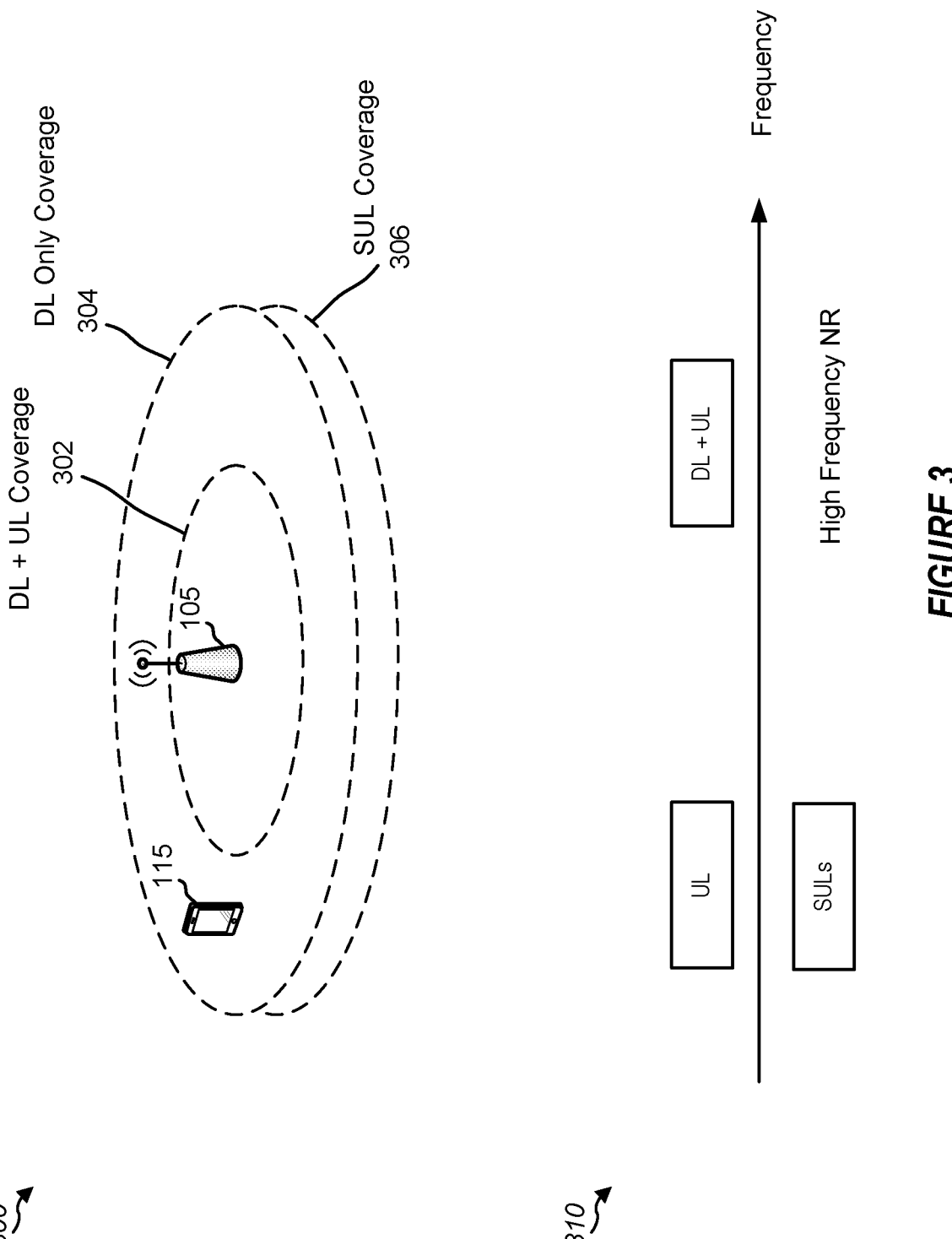
FIG. 3 is a diagram of an example of a wireless communication system configured to support an uplink (UL) carrier and multiple supplemental uplink (SUL) carriers according to some aspects of the present disclosure.

FIG. 3 is a diagram of an example of a wireless communication system 300 configured to support an uplink (UL) carrier and multiple supplementary uplink (SUL) carriers according to some aspects. As shown in FIG. 3, the wireless communication system 300 includes a UE 115 and a base station 105. Although one UE 115 and one base station 105 are shown, in other implementations, the wireless communication system 300 may include multiple UEs 115 and multiple base stations 105.

The base station 105 may be configured to support one or more cells, such as a primary cell, a secondary cell, or other cells. Unlike typical carrier aggregation (CA) systems, which support multiple carriers that are each for different respective cells, the base station 105 may be configured to support multiple carriers for a single cell. For example, the base station 105 may be configured to support a UL carrier and one or more SUL carriers for a particular cell, such as a primary cell. The UL cell and the SUL cell may be allocated to different resources, such as different time resources, different frequency resources, or both, while also being associated with the same cell (e.g., being associated with the same cell identifier (ID)). Due to the differences in frequency resources and the differences in power associated with transmitters of the UE 115 and the base station 105, the different carriers may have different coverage ranges. To illustrate, the wireless communication system 300 may be associated with a DL+UL coverage 302, a DL only coverage 304, and a SUL coverage 306 (associated with one or more SUL carriers). Due to one or more factors, such as attenuation of the UL signals or decreased transmitter power at the UE 115 compared to the base station 105, the DL+UL coverage 302 (e.g., a coverage associated with the UL carrier) is less than the SUL coverage 306. Thus, when the UE 115 is within the SUL coverage 306 but not the DL+UL coverage 302, improved UL transmission quality may be achieved through use of the one or more SUL carriers.

FIG. 3 also shows a frequency diagram 310 illustrating frequency resources allocated to the UL carrier and the one or more SUL carriers. As shown in FIG. 3, the UL carrier (e.g., the DL+UL) may be allocated to frequency resources having higher frequency than the frequency resources allocated to the one or more SUL carriers. As 5G NR wireless communication systems begin to support higher frequency communications, such as in the millimeter wave band, the UL carriers are allocated to these higher frequencies. However, communications at these higher frequencies may be more likely to experience attenuation or jamming. Thus, allocating a SUL carrier to frequency resources at lower frequencies, such as less than 2 gigahertz (GHz), may provide for extended UL transmission coverage in the wireless communication system 300.

In some implementations, two or more UL carriers, such as a non-SUL carrier and one or more SUL carriers may be configured one DL carrier of the same cell. The one or more SUL carriers may have a lower frequency as compared to the non-SUL carrier and may improve a UL coverage of the cell. It is noted that multiple low frequency bands may be available for an operator to deploy 5G and use as SUL carriers. For example, the multiple SUL carriers may be associated with a 2.3 gigahertz (GHz) band, a 700 megahertz (MHz) band, or a combination thereof. Additionally, random access (RA) Resources can be configured in both the non-SUL carrier and each of the one or more SUL carriers. In some implementations, PUSCH for a serving cell may be transmitted in a slot on non-SUL carrier or SUL carrier is based on an RRC configuration message (or an RRC reconfiguration message) or L1 signaling, such as downlink control information (DCI). Additionally, or alternatively, PUCCH either on non-SUL carrier or on SUL carrier based on control signaling, such as a UE specific RRC message.

The present disclosure provides systems, apparatus, methods, and computer-readable media for supporting multiple SUL carriers for use in transmission of UL messages by a UE. The techniques of the present disclosure may provide a wireless communication system that supports a UL carrier, such as a non-SUL carrier, and multiple SUL carriers for UL communications from the UE to a base station. The UL carrier and the multiple SUL carriers may be carriers of a same cell (e.g., a primary cell) supported by the base station, with the multiple SUL carriers being allocated to frequency resources having lower frequency than the frequency resources to which the UL carrier (e.g., the non-SUL carrier) is allocated. For example, the multiple SUL carriers may be associated with a 2.3 gigahertz (GHz) band, a 700 megahertz (MHz) band, or a combination thereof. The multiple SUL carriers may include a first SUL carrier, such as a primary SUL (pSUL) carrier, and a second SUL carrier, such as one or more secondary SUL (sSUL) carriers. The base station may determine and indicate a configuration of the UL carrier and the multiple carriers and may schedule the UE to use one or more carriers of the UL carrier and the multiple carriers. The UE may transmit a resource, such as a physical uplink shared channel (PUSCH) or a physical uplink control channel (PUCCH), via each of the one or more carrier. The UE may be configured to use the multiple SUL carriers by a base station may be scheduled to use one or more of the multiple SUL carriers.

To illustrate, the UE may transmit capability information to the base station. The capability information may indicate one or more carriers supported by the UE, a concurrent transmission via multiple carriers capability, a transmit power capability, a number of antenna, the like, or a combination thereof. The base station may determine a group of carriers that includes a UL carrier and a multiple SUL carriers and transmit an indication of the group of carriers to the UE. In some implementations, the indication of the group of carriers may further indicate a first SUL carrier of the multiple SUL carriers as a pSUL carrier, a second SUL carrier of the multiple SUL carriers a first sSUL carrier, a third SUL carrier of the multiple SUL carries as a second sSUL carrier, or a combination thereof. Additionally, the base station may select one or more carriers, from the group of carriers, for use by the UE in transmitting a UL message, such as PUSCH or PUCCH. For example, the base station may select the one or more carriers based on the capabilities of the UE, measurements performed by the base station, measurements received from the UE, one or more other techniques, or a combination thereof. The base station may send a message indicating the one or more carriers to the UE. The base station may indicate the group of carriers and the one or more carriers in the same message or in different messages. In some implementations, the base station may send one or more bits, such as a bit map, index value, or mapping value, to indicate a carrier of the group of carriers for the UE to use. Additionally, or alternatively, the base station may semi-statically or dynamically indicate the indicate the one or more carriers to the UE. The UE may transmit a UL message to the base station via the one or more carriers. For example, the one or more carriers may include the UL carrier (e.g., a non-SUL carrier), the first SUL, the second SUL, the third SUL, or a combination thereof. In some implementations, the UE may concurrently transmit the UL message via two or more carriers.

Particular implementations of the subject matter described in this disclosure can be implemented to realize one or more of the following potential advantages. In some aspects, the present disclosure provides an increased uplink coverage. For example, selective use of one or more SULs carrier may increase the UL transmission range of the wireless communication system, especially for wireless communication systems that support communications in higher frequencies, such as the millimeter wave band. Additionally, or alternatively, the present disclosure provides an increased uplink throughput (e.g., a peak through put) for the cell. For example, use of multiple SULs may increase the throughput of the wireless communication system, such as for the cell edge. Additionally, or alternatively, the selection or switching of the one or more carriers for transmitting the UL messages may provide more flexibility and more frequency diversity within the wireless communication system, which may reduce the effects of dynamic interference or jamming on UL transmissions.

Figure 4:
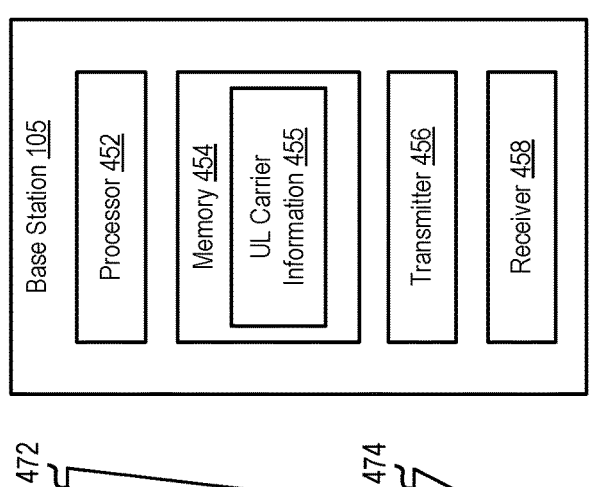
FIG. 4 is a block diagram of an example of a wireless communications system configured to support multiple SUL carriers according to some aspects of the present disclosure.
Figure 4:
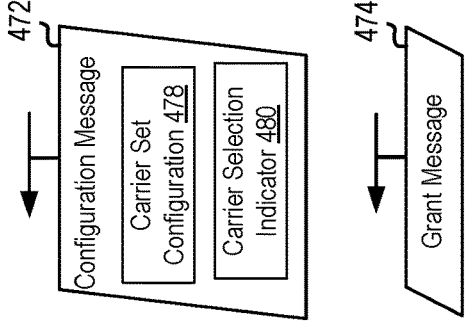
Figure 4:
Figure 4:
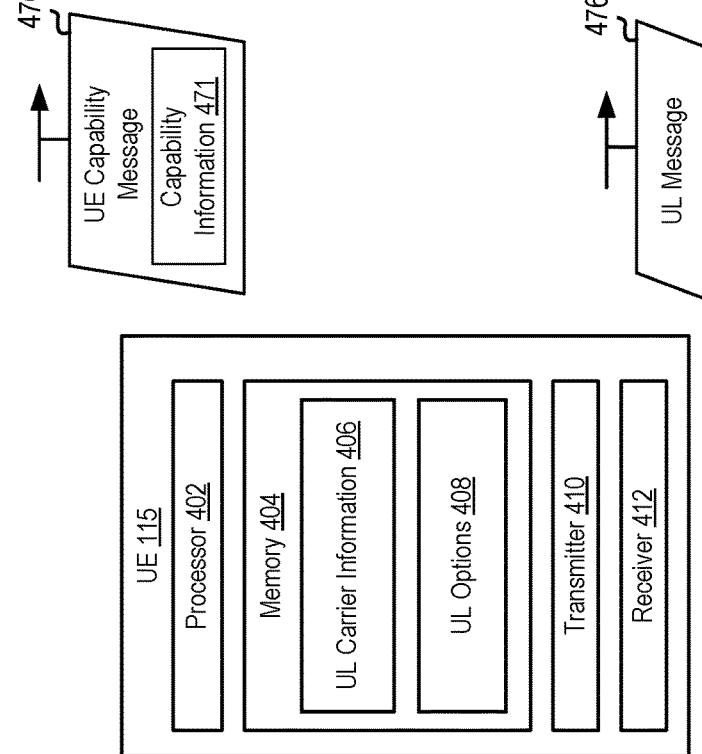

FIG. 4 is a block diagram of an example wireless communications system 400 configured to support multiple SUL carriers according to some aspects. In some examples, the wireless communications system 400 may implement aspects of the wireless network 100. The wireless communications system 400 includes the UE 115 and the base station 105. Although one UE 115 and one base station 105 are illustrated, in some other implementations, the wireless communications system 400 may generally include multiple UEs 115, and may include more than one base station 105.

The UE 115 can include a variety of components (such as structural, hardware components) used for carrying out one or more functions described herein. For example, these components can include one or more processors 402 (hereinafter referred to collectively as "the processor 402"), one or more memory devices 404 (hereinafter referred to collectively as "the memory 404"), one or more transmitters 410 (hereinafter referred to collectively as "the transmitter 410"), and one or more receivers 412 (hereinafter referred to collectively as "the receiver 412"). The processor 402 may be configured to execute instructions stored in the memory 404 to perform the operations described herein. In some implementations, the processor 402 includes or corresponds to one or more of the receive processor 258, the transmit processor 264, and the controller/processor 280, and the memory 404 includes or corresponds to the memory 282.

In some implementations, the memory 404 may be configured to store UL carrier information 406 and UL options 408. The UL carrier information 406 may include or indicate one or more carriers via which the UE 115 is able to communicate, one or more carriers via which the UE 115 is assigned or configured to communicate, one or more carriers via which the UE 115 is scheduled to use, or a combination thereof. Additionally, or alternatively, the UL carrier information 406 may indicate one or more UL carriers (e.g., a non-SUL carrier), one more SUL carriers, or a combination thereof. The one or more UL carriers may correspond to a first set of frequency resources, and the one or more SUL carriers may correspond to a second set of frequency resources. In some implementations, the second set of frequency resources may occupy lower bandwidths than the first set of frequency resources. For example, the first set of frequency resources that correspond to the UL carrier may be located within the millimeter wave band, or other high frequency bandwidths that are typical of 5G NR wireless communication systems. The second set of frequency resources that correspond to the SUL carrier may be located below 2 GHz, such as in NR band n80, n81, n82, n83, n84, or n86, as non-limiting examples. Additionally, or alternatively, at least a portion of the second set of frequency resources that correspond to the SUL carrier may be located below 700 MHz.

The UL options 408 may include or indicate one or more options (or one or more UL transmission modes) for the UE 115 to transmit a UL message. For example, the UE options 408 may include a first option in which the UE 115 uses a non-SUL carrier, a second option in which the UE 115 uses a first SUL carrier, a third option in which the UE uses a second SUL carrier, and a fourth option in which the UE 115 uses a combination of two or more of the non-SUL carrier, the first SUL carrier, and the second SUL carrier. The first SUL may include a primary SUL (pSUL) or a secondary SUL (sSUL), and the second SUL may include an sSUL. In some implementations, one or more additional options may be available, such as a fifth option in which the UE 115 uses a combination of two or more of the non-SUL carrier, the first SUL carrier, and the second SUL carrier that is different from the combination of the fourth option.

The transmitter 410 is configured to transmit reference signals, control information and data to one or more other devices, and the receiver 412 is configured to receive references signals, synchronization signals, control information and data from one or more other devices. For example, the transmitter 410 may transmit signaling, control information and data to, and the receiver 412 may receive signaling, control information and data from, the base station 105. In some implementations, the transmitter 410 and the receiver 412 may be integrated in one or more transceivers. Additionally or alternatively, the transmitter 410 or the receiver 412 may include or correspond to one or more components of the UE 115 described with reference to FIG. 2.

The base station 105 can include a variety of components (such as structural, hardware components) used for carrying out one or more functions described herein. For example, these components can include one or more processors 452 (hereinafter referred to collectively as "the processor 452"), one or more memory devices 454 (hereinafter referred to collectively as "the memory 454"), one or more transmitters 456 (hereinafter referred to collectively as "the transmitter 456"), and one or more receivers 458 (hereinafter referred to collectively as "the receiver 458"). The processor 452 may be configured to execute instructions stored in the memory 454 to perform the operations described herein. In some implementations, the processor 452 includes or corresponds to one or more of the receive processor 238, the transmit processor 220, and the controller/processor 240, and the memory 454 includes or corresponds to the memory 242.

In some implementations, the memory 454 may be configured to store UL carrier information 455. The UL carrier information 455 may include or correspond to the UL carrier information 406, the UL options 408, UE capability information, or a combination thereof, as illustrative, non-limiting examples.

The transmitter 456 is configured to transmit reference signals, synchronization signals, control information and data to one or more other devices, and the receiver 458 is configured to receive reference signals, control information and data from one or more other devices. For example, the transmitter 456 may transmit signaling, control information and data to, and the receiver 458 may receive signaling, control information and data from, the UE 115. In some implementations, the transmitter 456 and the receiver 458 may be integrated in one or more transceivers. Additionally or alternatively, the transmitter 456 or the receiver 458 may include or correspond to one or more components of base station 105 described with reference to FIG. 2.

In some implementations, the wireless communications system 400 implements a 5G New Radio (NR) network. For example, the wireless communications system 400 may include multiple 5G-capable UEs 115 and multiple 5G-capable base stations 105, such as UEs and base stations configured to operate in accordance with a 5G NR network protocol such as that defined by the 3GPP.

During operation of the wireless communications system 400, the wireless communications system 400 may support use of multiple SUL carriers to provide enhanced flexibility and increased edge cell throughput. To support the use of multiple SUL carriers, the base station 105 may configure one or more resources, such as one or more PUSCH resources, on multiple UL carriers, such as multiple UL carriers associated with cell, such as a single cell (e.g., a primary cell) supported by the base station 105. In some implementations, the multiple UL carriers may include at least a UL carrier and multiple SUL carriers. For example, the base station 105 may be configured to support the UL carrier and the multiple SUL carriers for a particular cell, such as a primary cell, and thus the UL carrier and the multiple SUL carrier may be associated with the same logical cell index. The base station 105 may select (e.g., activate) one or more carriers of the multiple UL carriers for use by the UE 115 in transmitting one or more UL messages.

The UE 115 may transmit a UE capability message 470 including capability information 471 to the base station 105. The capability information 471 indicates carrier capabilities, a concurrent transmission via multiple carriers capability, or a combination thereof. For example, the carrier capabilities may indicate or identify one or more carriers or frequency bands via which the UE 115 is configurable to communicate. The concurrent transmission via multiple carriers capability may indicate whether or not the UE 115 is configurable to simultaneously communicate (e.g., transmit) via multiple carriers. The base station 105 may receive the UE capability message 470 and may identify one or more capabilities of the UE 115 based on the capability information 471.

Based on the capability information 471, the base station 105 determines a carrier set configuration 478 for the UE 115. The carrier set configuration 478 indicates multiple UL carriers allocated to the UE 115, such as a non-SUL carrier and multiple SUL carriers. For example, the multiple SUL carriers may include a primary SUL carrier and one or more secondary SUL carriers. To further illustrate, the multiple UL carriers indicated by the carrier set configuration 478 may be selected from a group of carriers that the UE 115 is able to support. The base station 105 transmits a configuration message 472 (or a control message) to the UE 115. The configuration message 472 includes the carrier set configuration 478. In some implementations, the configuration message 472 or the carrier set configuration 478 indicates a resource associated with the carrier set configuration 478. For example, the resource may include or correspond to a PUSCH resource or a PUCCH resource. In some implementations, the configuration message 4720 may include or correspond to a radio resource control (RRC) message or L1 DCI signaling. In some implementations, the PUCCH may be specified on either the non-SUL carrier or the SUL carrier based on the RRC message, such as the configuration message 472.

Additionally, or alternatively, the base station 105 selects one or more carriers of the multiple carriers to be used by the UE 115 for communication of a channel, such as PUSCH. The base station 105 may select a carrier set configuration 478 based on measurements performed by the base station 105, information received from the UE 115, priorities associated with the UL carrier and the SUL carrier, a distance between the UE 115 and the base station 105, other information, or a combination thereof. For example, the non-SUL carrier may have a higher priority than the SUL carriers, such that the UL carrier is selected in situations in which either carrier may provide sufficient performance. Sufficient performance may be determined based on measurements performed by the base station 105, information received from the UE 115, or the distance between the UE 115 and the base station 105. For example, the base station 105 may select one or more carriers based on channel quality measurements, channel state information (CSI), sounding reference signals (SRSs), or a combination thereof, received from the UE 115. To illustrate, the base station 105 may determine which carrier is associated with a higher channel quality based on the CSI message(s), and the base station 105 may select the carrier associated with the higher channel quality as the selected carrier. As another example, the base station 105 may determine which carrier is associated with a higher channel quality based on the SRSs received via different carriers, and the base station 105 may select the carrier associated with the higher channel quality as the selected carrier. In other implementations, the SUL carriers may have a higher priority than the UL carrier, and one or more of the SUL carriers may be selected. When selecting the one or more SUL carriers, the pSUL carrier may have priority over the sSUL carrier. Additionally, or alternatively, the one or more SUL carriers may be selected based on based on measurements performed by the base station 105 or information received from the UE 115.

The base station 105 generates a carrier selection indicator 480 to indicate the one or more carries and transmits the carrier selection indicator 480 to the UE 115. For example, the carrier selection indicator 480 may be included in the configuration message 472. Additionally, or alternatively, the carrier selection indicator 480 may be included a different message, such as a grant message 474. The carrier selection indicator 480 may include one or more bits, such as a bitmap in which each bit corresponds to a different carrier of the of the multiple carriers. In some implementations, when the one or more carriers include multiple carriers, the carrier selection indicator 480 may include a separate indicator for each carrier. To illustrate, the each indicator may be included in different DCI.

The UE 115 receives the carrier set configuration 478 and the carrier selection indicator 480. Based on the carrier selection indicator 480, the UE 115 selects the one or more carriers. The UE 115 transmits a UL message 476 on each of the one or more carriers to the base station 105.

In some implementations, a UE 115 may be configured for a cell with one DL carrier and multiple UL carriers. The multiple UL carriers may include a non-SUL carrier, a first SUL carrier (e.g., a pSUL carrier), a second SUL carrier (e.g., an sSUL carrier), or a combination thereof. As an illustrative, non-limiting example, the multiple carriers include the non-SUL carrier, one pSUL carrier, and one sSUL carrier. It is noted that the carrier set configuration 478 may indicate whether or not at least one SUL is a pSUL carrier or an sSUL. In some implementations, the multiple carries may also include a third SUL carrier (e.g., an sSUL carrier). A SUL carrier is configured in a lower frequency as compared to the non-SUL carrier an may provide a higher uplink throughput for cell edge UE as compared to the non-SUL carrier. In some implementations, an operator of a wireless communication network may have the have multiple frequency resources available for SUL carriers, such as a first frequency resource associated with 2.3 GHZ and a second frequency resource associated with 700 MHZ, as illustrative, non-limiting examples.

When configured for the multiple UL carriers, the UE 115 may transmit PUSCH on the non-SUL carrier or a SUL carrier, such as the first SUL carrier, or the second SUL carrier. Stated differently, the UE 115 may transmit the PUSCH on the non-SUL carrier, one or more SUL carriers (e.g., a pSUL carrier or one or more sSUL carriers), or a combination thereof. The PUSCH transmission will be on the non-SUL carrier or the SUL carrier based on a radio resource control (RRC) configuration signaling (or an RRC reconfiguration signaling) or L1 DCI signaling. For example, the carrier selection indicator 478 may include one or more bits to indicate the one or more carriers. The one or more bits may include or indicate a carrier or carrier index value, an option of multiple options, or one or more bit maps, as illustrative, non-limiting examples.

In some implementations, the carrier selection indicator 480 may indicate a UL option of the multiple UL options 408. To illustrate, the carrier selection indicator 480 may indicate a first option in which the UE 115 transmits the PUSCH on the non-SUL carrier, a second option in which the UE 115 transmits the PUSCH on the pSUL carrier, or a third option in which the UE 115 transmits the PUSCH on the sSUL carrier, as illustrative, non-limiting examples. In some implementations, the carrier selection indicator 480 may indicate one or more other options in which the UE 115 transmits the PUSCH on multiple carriers. For example, the multiple carriers may include the non-SUL carrier and the pSUL carrier, the non-SUL carrier and the sSUL carrier, the pSUL carrier and the sSUL carrier, or two or more sSUL carriers (if two sSUL carriers are configured). It is noted that simultaneous transmission on two UL carries, such as two SUL carriers, may improve or increase the cell edge coverage, a peak cell throughput, the cell edge throughput, or a combination thereof. In some implementations, the UE 115 may transmit the capability information 471 to the base station 105 to indicate whether or not the UE 115 supports concurrent transmission of the PUSCH on multiple carriers.

In some implementations, the base station 105 may transmit the carrier selection indicator 480 to indicate which option the UE 115 is to use for PUSCH transmission. The base station 105 may transmit the carrier selection indicator 480 as part of RRC reconfiguration signaling or L1 DCI signaling. For example, UE specific RRC signaling may configure or de-configure the PUSCH which is semi-statically scheduled according to one option of the UL options 408. As another option, UE specific RRC signaling may configure or de-configure the PUSCH which is dynamically scheduled according to one option of the UL options 408.

In some implementations, the carrier selection indicator 480 includes one or more bitmaps included in the grant message 474, such as a UL grant message. For example, each bitmap may be included in an associated DCI field of the grant message 474. To illustrate, in implementations where the multiple UL carriers include the non-SUL carrier, the pSUL carrier, and the sSUL carriers, the bitmap may include a bit for each carrier, such as a first bit (b1) associated with the non-SUL carrier, a second bit (b2) associated with the pSUL carrier, and a third bit (b3) associated with the sSUL carrier. The bitmap may be represented as b1b2b3. It is noted that fewer bits or more bits may be included in the bitmap based on a number of carriers. A value of the bitmap of "100" may be associated with the first option, a value of the bitmap of "010" may be associated with the second option, and a value of the bitmap of "001" may be associated with the third option. To indicate options in which the PUSCH is transmitted on multiple carriers, multiple bitmaps may be used. For example a first DCI of the grant message 474 may include a first bitmap and a second DCI of the grant message 474 may include a second bitmap. To illustrate, the first bitmap may have a value of "010" and the second bitmap may have a value of "001". In some implementations, each DCI may include a different frequency domain resource assignment (FDRA), a time domain resource assignment (TDRA), a modulation and coding scheme, a new data indicator, a redundancy version (RV), a HARQ process ID for PUSCH, or a combination thereof.

It is noted, that after the grant message 474, the UE 115 may receive a subsequent grant message with another carrier selection indicator. Based on the subsequent grant message, the UE 115 transmit the PUSCH on one or more carries as indicated by the carrier selection indicator of the subsequent grant message. Additionally, or alternatively, PUCCH, SRS, or both can be independently configured in the non-SUL carrier or one or more of the SUL carriers via UE specific RRC signaling, irrespective of the carrier configuration for PUSCH.

The wireless communications system 400 may be implemented to realize one or more of the following potential advantages. In some aspects, the wireless communications system 400 provides an increased uplink coverage. For example, use of the SUL carrier may increase the UL transmission range of the UE 115 due to the SUL carrier occupying lower bandwidths than the UL carrier, which may occupy bandwidths within the millimeter wave band or other high frequencies. Additionally, or alternatively, the wireless communications system 400 provides an increased uplink throughput (e.g., a peak through put) for the cell. For example, use of multiple SULs may increase the throughput of the wireless communication system 400, such as for the cell edge. Additionally, or alternatively, the selection or switching of the one or more carriers for transmitting the UL messages may provide more flexibility and more frequency diversity within the wireless communication system 400, which may reduce the effects of dynamic interference or jamming on UL transmissions.

FIG. 5 is a diagram of examples of a time division duplex (TDD) carrier and one or more SUL carriers according to some aspects. Additionally, each example includes multiple carriers, such as multiple carriers corresponding to the carrier set configuration 478. The multiple carriers include a TDD carrier, a primary SUL (pSUL), and a secondary SUL (sSUL). Each of the TDD carrier, the pSUL, and the sSUL include a respective plurality of resources designated for wireless communications by a UE and a base station. The resources include time resources (e.g., a plurality of slots) and frequency resources. The TDD carrier and the SUL carriers may occupy the same time resources and different frequency resources. For example, the SUL carriers may occupy lower frequency bandwidths than the TDD carrier, to increase the distance of transmission sent using a SUL carrier. The UE 115 uses one or more of the multiple carriers based on a carrier selection indicator, such as the carrier selection indicator 480. In some implementations, the TDD carrier may be time division duplexed (TDD) into slots for downlink reservations (D), uplink reservations (U), and shared reservations(S). The SUL carriers may be configured into slots for uplink reservations. In each example, a shaded symbol indicates a transmission occurred on the carrier.

A first example in which uplink transmissions occur on the TDD carrier (e.g., a non-SUL carrier) and the pSUL is shown at 500. For example, the uplink transmission may include or correspond to PUSCH transmissions. As shown, uplink transmissions switch between the TDD carrier and the pSUL carrier. For example, the UE 115 may dynamically switch between the TDD carrier and the pSUL carrier based on UL scheduling, which may include or correspond to the carrier selection indicator 480.

A second example in which uplink transmissions occur on the sSUL is shown at 530. For example, the uplink transmissions may include or correspond to PUSCH transmission. The UE 115 may transmit the PUSCH on the sSUL carrier based on a configuration message, such as the configuration message 472 or the grant message 474.

A third example in which uplink transmissions simultaneously occur on the pSUL carrier and the sSUL carrier is shown at 550. For example, the uplink transmissions may include or correspond to PUSCH transmission. The UE 115 may transmit the PUSCH on the pSUL carrier and the sSUL carrier based on a configuration message, such as the configuration message 472 or the grant message 474.

Figures 6, 7:
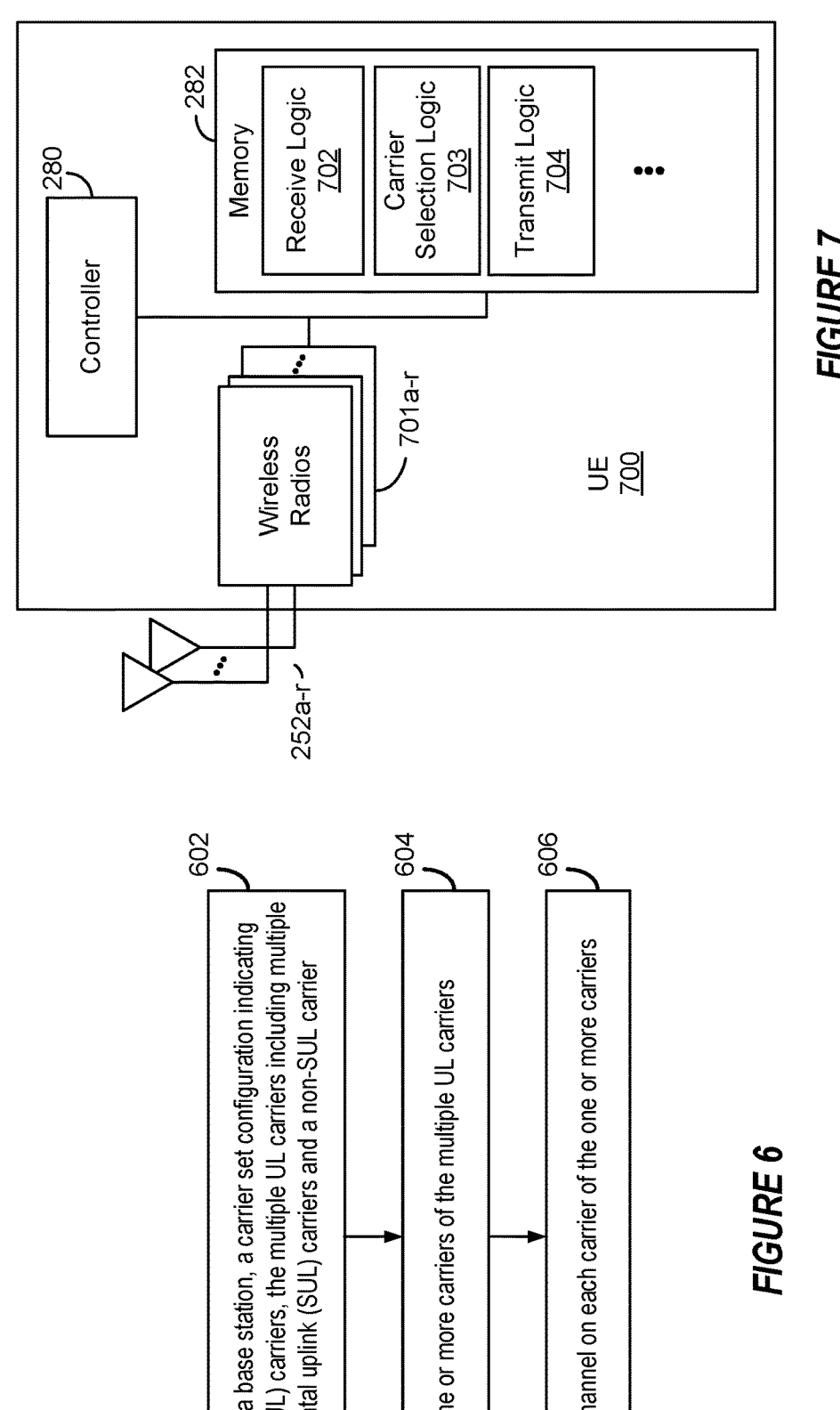
FIG. 6 is a flow diagram illustrating an example process that supports multiple SUL carriers according to some aspects of the present disclosure.
FIG. 7 is a block diagram of an example UE that supports multiple SUL carriers according to some aspects of the present disclosure.

FIG. 6 is a flow diagram illustrating an example process 600 that supports multiple SUL carriers according to some aspects. Operations of the process 600 may be performed by a UE, such as the UE 115 described above with reference to FIGS. 1, 2, and 4, or a UE as described with reference to FIG. 7. For example, example operations (also referred to as "blocks") of the process 600 may enable the UE 115 to support multiple SUL carriers for transmission of a UL message.

In block 602, the UE receives, from a base station, a carrier set configuration indicating multiple UL carriers. The base station may include or correspond to the base station 105. Additionally, or alternatively, the carrier set configuration may include or correspond to the configuration message 472, the carrier set configuration 478, or a combination thereof. The multiple UL carriers may include or correspond to the UL carrier information 406 or 455. The multiple UL carriers include multiple SUL carriers and a non-SUL carrier. For example, the multiple SUL carriers may include or correspond to the SUL carriers of FIG. 3. The multiple SUL carriers may include a primary SUL carrier and one or more secondary SUL carriers. In some implementations, the multiple SUL carriers include the primary SUL carrier and two or more secondary SUL carriers.

In block 604, the UE selects one or more carriers of the multiple UL carriers. For example, the UE may select the one or more carriers based on the configuration message 472, the carrier set configuration 478, the carrier selection indicator 480, the UL options 408, the grant message 474, DCI, or a combination thereof. In some implementations, the one or more carriers may include the non-SUL carrier. Additionally, or alternatively, the one or more carriers include a first SUL carrier of the multiple SUL carriers, a second SUL carrier of the multiple SUL carriers, or a combination thereof. For example, the first SUL carrier may include a pSUL carrier or an sSUL carrier. Additionally, or alternatively, the second SUL carrier may include an sSUL carrier. In some implementations, the one or more carriers includes two sSUL carriers.

In block 606, the UE transmits a channel on each carrier of the one or more carriers. The channel may include or correspond to the UL message 476. In some implementations, the channel includes a PUSCH.

In some implementations, the UE transmits a capability message including capability information. For example, the capability message and the capability information may include or correspond to the UE capability message 470 and the capability information 471, respectively. The capability information may indicate carrier capabilities, a concurrent transmission via multiple UL carriers capability, or a combination thereof, as illustrative, non-limiting examples.

In some implementations, the UE receive a configuration message from the base station. For example, the configuration message may include or correspond to the configuration message 472. The configuration message may include an RRC message or L1 DCI signaling. Additionally, or alternatively, the configuration message includes the carrier set configuration, a carrier selection indicator, or a combination thereof. The carrier set configuration and the carrier selection indicator may include or correspond to the carrier set configuration 478 and the carrier selection indicator 480, respectively.

In some implementations, the UE receives a carrier selection indicator from the base station. The carrier selection indicator may include or correspond to the carrier selection indicator 480. In some implementations, the carrier selection indicator indicates one or multiple carriers. The carrier selection indicator may include one or more bits, one or more DCI, or a combination thereof. In some implementations, the carrier selection indicator includes a bitmap. In some such implementations, each bit corresponds to a different carrier of the of the multiple carriers. The UE may select the one or more carriers based on the carrier selection indicator.

In some implementations, the carrier selection indicator includes a first DCI associated with a first carrier of the multiple carriers and a second DCI associated with the second carrier of the multiple carriers. For example, the first DCI and the second DCI may be included in the grant message 474. Each of the first DCI and the second DCI includes an FDRA, a TDRA, a modulation and coding scheme, a new data indicator, an RV, an HARQ ID, or a combination thereof. In such implementations, the UE may transmit the channel via each of the first carrier and the second carrier.

In some implementations, the carrier selection indicator is associated with a semi-static configuration. Additionally, or alternatively, the carrier selection indicator is received in a grant message in DCI. The grant message may include or correspond to the grant message 474. The UE may select, based on the carrier selection indicator, a set of carriers of the multiple carriers. The set of carriers may be different from the one or more carriers. For example, the one or more carriers may include a first carrier and the set of carriers may include a second carrier. The UE may transmit the channel on each carrier of the set of carriers.

As described with reference to FIG. 6, the present disclosure provides techniques for use of multiple SUL carriers. The use of multiple SUL carriers may provide increased flexibility for deployment and scheduling of uplink communications. Additionally, or alternatively, the use of multiple SUL carriers may improve or increase uplink coverage, peak throughput, or a combination thereof. For example, selective use of one or more SUL carriers may increase or improve an uplink coverage or peak throughput associated with a cell edge.

FIG. 7 is a block diagram of an example UE 700 that supports multiple SUL carriers according to some aspects. The UE 700 may be configured to perform operations, including the blocks of the process 600 described with reference to FIG. 6. In some implementations, the UE 700 includes the structure, hardware, and components shown and described with reference to the UE 115 of FIG. 2 or 4. For example, the UE 700 includes the controller/processor 280, which operates to execute logic or computer instructions stored in the memory 282, as well as controlling the components of the UE 700 that provide the features and functionality of the UE 700. The UE 700, under control of the controller/processor 280, transmits and receives signals via wireless radios 701a-r and the antennas 252a-r. The wireless radios 701a-r include various components and hardware, as illustrated in FIG. 2 for the UE 115, including the modulator and demodulators 254a-r, the MIMO detector 256, the receive processor 258, the transmit processor 264, and the TX MIMO processor 266.

As shown, the memory 282 may include receive logic 702, carrier selection logic 703, and transmit logic 704. The receive logic 702 may be configured to enable reception of data or signals, such as configuration messages and scheduling messages, using the wireless radios 701a-r and the antennas 252a-r. The carrier selection logic 703 may be configured to select a carrier, from a group of a UL carrier and multiple SUL carriers, for transmitting a UL message, such as the UL message 476. The transmit logic 704 may be configured to enable transmission of data or signals, such as a UL message, using the wireless radios 701a-r and the antennas 252a-r. The UE 700 may receive signals from or transmit signals to one or more network entities, such as the base station 105 of FIGS. 1, 2, and 4, or a base station as illustrated in FIG. 9.

In some implementations, the UE 700 may be configured to perform the process 600 of FIG. 6. To illustrate, the UE 700 may execute, under control of the controller/processor 280, the receive logic 702, the carrier selection logic 703, and the transmit logic 704 stored in the memory 282. The execution environment of the receive logic 702 provides the functionality to perform at least the operations in block 602. The execution environment of the carrier selection logic 703 provides the functionality to perform at least the operations in block 604. The execution environment of the transmit logic 704 provides the functionality to perform at least the operations in block 606.

FIG. 8 is a flow diagram illustrating an example process 800 that supports multiple SUL carriers according to some aspects. Operations of the process 800 may be performed by a base station, such as the base station 105 described above with reference to FIGS. 1, 2, and 4, or a base station as described with reference to FIG. 9. For example, example operations of the process 800 may enable the base station 105 to select a carrier, from multiple SUL carriers, and indicate the selected SUL carrier to a UE for use in transmitting a UL message.

In block 802, the base station transmits, to a UE, a carrier set configuration indicating multiple UL carriers. The UE may include or correspond to the UE 115. Additionally, or alternatively, the carrier set configuration may include or correspond to the configuration message 472, the carrier set configuration 478, or a combination thereof. The multiple UL carriers may include or correspond to the UL carrier information 406 or 455. The multiple UL carriers may include multiple SUL carriers and a non-SUL carrier. For example, the multiple SUL carriers may include or correspond to the SUL carriers of FIG. 3. In some implementations, the multiple SUL carriers may include a primary SUL carrier and one or more secondary SUL carriers.

In block 804, the base station selects one or more carriers of the multiple UL carriers. In some implementations, the one or more carriers include the non-SUL carrier. Additionally, or alternatively, the one or more carriers may include a first SUL carrier of the multiple SUL carriers, a second SUL carrier of the multiple SUL carriers, or a combination thereof. For example, the first SUL carrier may include a pSUL carrier or an sSUL carrier. Additionally, or alternatively, the second SUL carrier includes an sSUL carrier. In some implementations, the one or more carriers includes two sSUL carriers.

In block 806, the base station receives, from the UE, a channel on each carrier of the one or more carriers. The channel may include or correspond to the UL message 476. In some implementations, the channel includes a PUSCH.

In some implementations, the base station receives a capability message including capability information for the UE. For example, the capability message and the capability information may include or correspond to the UE capability message 470 and the capability information 471, respectively. The capability information may indicate carrier capabilities, a concurrent transmission via multiple UL carriers capability, or a combination thereof, as illustrative, non-limiting examples.

In some implementations, the base station transmits a configuration message to the UE. For example, the configuration message may include or correspond to the configuration message 472. The configuration message may include an RRC message or L1 DCI signaling. Additionally, or alternatively, the configuration message includes the carrier set configuration, a carrier selection indicator, or a combination thereof.

In some implementations, the base station transmits a carrier selection indicator indicating one or more carriers of the multiple carriers. The UE may select the one or more carriers based on the carrier selection indicator. The carrier selection indicator may include or correspond to the carrier selection indicator 480. The carrier selection indicator includes one or more bits, one or more DCI, or a combination thereof. The carrier selection indicator may include one or more bits, one or more DCI, or a combination thereof. In some implementations, the carrier selection indicator includes a bitmap. In some such implementations, each bit corresponds to a different carrier of the of the multiple carriers.

In some implementations, the carrier selection indicator includes a first DCI associated with a first carrier of the multiple carriers and a second DCI associated with the second carrier of the multiple carriers. For example, the first DCI and the second DCI may be included in the grant message 474. Each of the first DCI and the second DCI includes an FDRA, a TDRA, a modulation and coding scheme, a new data indicator, an RV, an HARQ ID, or a combination thereof. In some implementations, the carrier selection indicator is associated with a semi-static configuration. The carrier selection indicator is transmitted in a grant message in DCI. In some implementations, a first carrier selection indicator is transmitted in a first grant message and a second grant message is transmitted in a second grant message after the first grant message. The UE may select a first set of carriers of the multiple carriers based on the first selection indicator and transmit the channel on the first set of carriers. After transmission of the channel on the first set of carriers, the UE may select a second set of carriers of the multiple carriers based on the second carrier selection indicator and transmit the channel on the second set of carriers. The base station may receive the channel on each carrier of the first set of carriers and the second set of carriers.

As described with reference to FIG. 8, the present disclosure provides techniques for use of multiple SUL carriers. The use of multiple SUL carriers may provide increased flexibility for deployment and scheduling of uplink communications. Additionally, or alternatively, the use of multiple SUL carriers may improve or increase uplink coverage, peak throughput, or a combination thereof. For example, selective use of one or more SUL carriers may increase or improve an uplink coverage or peak throughput associated with a cell edge.

FIG. 9 is a block diagram of an example base station 900 that supports multiple SUL carriers according to some aspects. The base station 900 may be configured to perform operations, including the blocks of the process 800 described with reference to FIG. 8. In some implementations, the base station 900 includes the structure, hardware, and components shown and described with reference to the base station 105 of FIGS. 1, 2, and 4. For example, the base station 900 may include the controller/processor 240, which operates to execute logic or computer instructions stored in the memory 242, as well as controlling the components of the base station 900 that provide the features and functionality of the base station 900. The base station 900, under control of the controller/processor 240, transmits and receives signals via wireless radios 901*a-t* and the antennas 234*a-t*. The wireless radios 901*a-t* include various components and hardware, as illustrated in FIG. 2 for the base station 105, including the modulator and demodulators 232*a-t*, the transmit processor 220, the TX MIMO processor 230, the MIMO detector 236, and the receive processor 238.

As shown, the memory 242 may include carrier selection logic 902, transmit logic 903, and receive logic 904. The carrier selection logic 902 may be configured to select a carrier, from the group of a UL carrier and multiple SUL carriers, for a UE to use to transmit a UL message, such as UL message 476. The transmit logic 903 may be configured to enable transmission of data or signals, such as configuration messages and scheduling messages, using the wireless radios 901*a-t* and the antennas 234*a-t*. The receive logic 904 may be configured to enable reception of data or signals, such as UL messages, using the wireless radios 901*a-t* and the antennas 234*a-t*. The base station 900 may receive signals from or transmit signals to one or more UEs, such as the UE 115 of FIGS. 1, 2, and 4, or the UE 700 of FIG. 7.

In some implementations, the base station 900 may be configured to perform the process 800 of FIG. 8. To illustrate, the base station 900 may execute, under control of the controller/processor 240, the carrier selection logic 902, the transmit logic 903, and the receive logic 904 stored in the memory 242. The execution environment of the carrier selection logic 902 provides the functionality to perform at least the operations in block 804. The execution environment of the transmit logic 903 provides the functionality to perform at least the operations in block 802. The execution environment of the receive logic 904 provides the functionality to perform at least the operations in block 806.

It is noted that one or more blocks (or operations) described with reference to FIGS. 6 and 8 may be combined with one or more blocks (or operations) described with reference to another of the figures. For example, one or more blocks (or operations) of FIG. 6 may be combined with one or more blocks (or operations) of FIG. 8. As another example, one or more blocks associated with FIG. 6 or 8 may be combined with one or more blocks (or operations) associated with FIG. 1, 2, 4, 7, or 9. Additionally, or alternatively, one or more blocks associated with FIGS. 7 and 9 may be combined with one or more blocks (or operations) associated with FIGS. 2 and 4.

In some aspects, techniques for supporting multiple SUL carriers may include additional aspects, such as any single aspect or any combination of aspects described below or in connection with one or more other processes or devices described elsewhere herein. In some aspects, supporting multiple SUL carriers may include an apparatus configured to receive, from a base station, a carrier set configuration indicating multiple UL carriers. The multiple UL carriers including multiple SUL carriers and a non-SUL carrier. The apparatus is further configured to select one or more carriers of the multiple UL carriers, and transmit a channel on each carrier of the one or more carriers. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, a method of wireless communication may include one or more operations described herein with reference to the apparatus.

In a first aspect, the multiple SUL carriers include a primary SUL carrier and one or more secondary SUL carriers.

In a second aspect, alone or in combination with the first aspect, the channel includes a PUSCH.

In a third aspect, alone or in combination with one or more of the first through second aspects, the apparatus is further configured to transmit a capability message including capability information.

In a fourth aspect, in combination with the third aspect, the capability information indicates carrier capabilities, a concurrent transmission via multiple UL carriers capability, or a combination thereof.

In a fifth aspect, alone or in combination with one or more of the first through fourth aspects, the apparatus is further configured to receive a configuration message from the base station.

In a sixth aspect, in combination with the fifth aspect, the configuration message includes an RRC message or L1 DCI signaling.

In a seventh aspect, in combination with the fifth through sixth aspects, the configuration message includes the carrier set configuration, a carrier selection indicator, or a combination thereof.

In an eighth aspect, alone or in combination with one or more of the first through seventh aspects, the apparatus is further configured to receive, from the base station, a carrier selection indicator.

In a ninth aspect, in combination with the eighth aspect, the one or more carriers are selected based on the carrier selection indicator.

In a tenth aspect, in combination with the ninth aspect, the carrier selection indicator includes one or more bits, one or more DCI, or a combination thereof.

In an eleventh aspect, in combination with one or more of the ninth through tenth aspects, the carrier selection indicator includes a bitmap, and wherein each bit corresponds to a different carrier of the of the multiple carriers.

In a twelfth aspect, in combination with one or more of the tenth through eleventh aspects, the carrier selection indicator indicates one or multiple carriers.

In a thirteenth aspect, in combination with one or more of the tenth through eleventh aspects, the carrier selection indicator includes a first DCI associated with a first carrier of the multiple carriers and a second DCI associated with the second carrier of the multiple carriers.

In a fourteenth aspect, in combination with the thirteenth aspect, each of the first DCI and the second DCI includes an FDRA, a TDRA, a modulation and coding scheme, a new data indicator, an RV, a HARQ ID, or a combination thereof.

In a fifteenth aspect, alone or in combination with one or more of the first through fourteenth aspects, the one or more carriers include the non-SUL carrier.

In a sixteenth aspect, alone or in combination with one or more of the first through fifteenth aspect, the one or more carriers include a first SUL carrier of the multiple SUL carriers, a second SUL carrier of the multiple SUL carriers, or a combination thereof.

In a seventeenth aspect, in combination with the sixteenth aspect, the first SUL carrier includes a pSUL carrier or an sSUL carrier.

In an eighteenth aspect, in combination with the seventeenth aspect, the second SUL carrier includes an sSUL carrier.

In a nineteenth aspect, alone or in combination with one or more of the first through eighteenth aspects, the carrier selection indicator is associated with a semi-static configuration.

In a twentieth aspect, alone or in combination with one or more of the first through eighteenth aspects, the carrier selection indicator is received in a grant message in DCI.

In a twenty-first aspect, in combination with the twentieth aspect, the apparatus is further configured to select, based on the carrier selection indicator, a set of carriers of the multiple carriers.

In a twenty-second aspect, in combination with the twenty-first aspect, the apparatus is further configured to transmit the channel on each carrier of the set of carriers.

In some aspects, techniques for supporting multiple SUL carriers may include additional aspects, such as any single aspect or any combination of aspects described below or in connection with one or more other processes or devices described elsewhere herein. In some aspects, supporting multiple SUL carriers may include an apparatus configured to transmit, to a UE, a carrier set configuration indicating multiple UL carriers. The multiple UL carriers including multiple SUL carriers and a non-SUL carrier. The apparatus is further configured to select one or more carriers of the multiple UL carriers, and receive, from the UE, a channel on each carrier of the one or more carriers. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein. In some implementations, a method of wireless communication may include one or more operations described herein with reference to the apparatus.

In a twenty-third aspect, the multiple SUL carriers include a primary SUL carrier and one or more secondary SUL carriers.

In a twenty-fourth aspect, alone or in combination with the twenty-third aspect, the channel includes a PUSCH.

In a twenty-fifth aspect, alone or in combination with one or more of the twenty-third through twenty-fourth aspects, the apparatus is further configured to receive a capability message including capability information for the UE.

In a twenty-sixth aspect, in combination with the twenty-fifth aspect, the capability information indicates carrier capabilities, a concurrent transmission via multiple UL carriers capability, or a combination thereof.

In a twenty-seventh aspect, alone or in combination with one or more of the twenty-third through twenty-sixth aspects, the apparatus is further configured to transmit a configuration message to the UE.

In a twenty-eighth aspect, in combination with the twenty-seventh aspect, the configuration message includes an RRC message or L1 DCI signaling.

In a twenty-ninth aspect, in combination with one or more of the twenty-seventh through twenty-eighth aspects, the configuration message includes the carrier set configuration, a carrier selection indicator, or a combination thereof.

In a thirtieth aspect, alone or in combination with one or more of the twenty-third through twenty-ninth aspects, the apparatus is further configured to transmit a carrier selection indicator indicating one or more carriers of the multiple carriers.

In a thirty-first aspect, in combination with the thirtieth aspect, the carrier selection indicator includes one or more bits, one or more DCI, or a combination thereof.

In a thirty-second aspect, in combination with one or more of the thirtieth through thirty-first aspects, the carrier selection indicator includes a bitmap, and wherein each bit corresponds to a different carrier of the of the multiple carriers In a thirty-third aspect, in combination with one or more of the thirtieth through thirty-second aspects, the carrier selection indicator indicates one or multiple carriers.

In a thirty-fourth aspect, in combination with one or more of the thirtieth through thirty-second aspects, the carrier selection indicator includes a first DCI associated with a first carrier of the multiple carriers and a second DCI associated with the second carrier of the multiple carriers.

In a thirty-fifth aspect, in combination with the thirty-third aspect, each of the first DCI and the second DCI includes an FDRA, a TDRA, a modulation and coding scheme, a new data indicator, an RV, a HARQ ID, or a combination thereof.

In a thirty-sixth aspect, alone or in combination with one or more of the twenty-third through thirty-fifth aspects, the one or more carriers include the non-SUL carrier.

In a thirty-seventh aspect, alone or in combination with one or more of the twenty-third through thirty-sixth aspects, the one or more carriers include a first SUL carrier of the multiple SUL carriers, a second SUL carrier of the multiple SUL carriers, or a combination thereof.

In a thirty-eighth aspect, in combination with the thirty-seventh aspect, the first SUL carrier includes a pSUL carrier or an sSUL carrier.

In a thirty-ninth aspect, in combination with the thirty-seventh aspect, the second SUL carrier includes an sSUL carrier.

In a fortieth aspect, alone or in combination with one or more of the twenty-third through thirty-ninth aspects, the carrier selection indicator is associated with a semi-static configuration.

In a forty-first aspect, alone or in combination with one or more of the twenty-third through thirty-ninth aspects, the carrier selection indicator is received in a grant message in DCI.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-9 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication performed by a user equipment (UE), the method comprising:

receiving, from a base station, a carrier set configuration indicating multiple uplink (UL) carriers, the multiple UL carriers including multiple supplemental uplink (SUL) carriers and a non-SUL carrier, wherein the multiple SUL carriers include a primary SUL carrier and one or more secondary SUL carriers;

receiving, from the base station, a carrier selection indicator included in downlink control information (DCI), wherein the carrier selection indicator includes a first DCI associated with a first carrier of the multiple UL carriers and a second DCI associated with a second carrier of the multiple UL carriers;

selecting one or more carriers of the multiple UL carriers, wherein the one or more carriers are selected based on the carrier selection indicator; and transmitting a channel on each carrier of the one or more carriers.

2. The method of claim 1, wherein the channel includes a physical uplink shared channel (PUSCH).

3. The method of claim 1, further comprising:

transmitting a capability message including capability information; and wherein the capability information indicates carrier capabilities, a concurrent transmission via multiple UL carriers capability, or a combination thereof.

4. The method of claim 1, further comprising:

receiving, from the base station, a configuration message that includes the carrier set configuration, the carrier selection indicator, or a combination thereof, and wherein the configuration message includes a radio resource configuration (RRC) message or layer 1 (L1) downlink control information (DCI) signaling.

5. The method of claim 4, wherein the carrier selection indicator is associated with a semi-static configuration or is received in a grant message in DCI.

6. The method of claim 4, further comprising:

selecting, based on the carrier selection indicator, a set of carriers of the multiple UL carriers; and transmitting the channel on each carrier of the set of carriers, and wherein the carrier selection indicator is received in a grant message in DCI.

7. The method of claim 1, further comprising:

receiving, from the base station, the carrier selection indicator included in downlink control information (DCI); and wherein the one or more carriers are selected based on the carrier selection indicator.

8. The method claim 7, wherein:

the carrier selection indicator includes a bitmap, each bit corresponds to a different carrier of the of the multiple UL carriers; and the carrier selection indicator indicates one carrier or multiple carriers.

9. The method of claim 1, wherein each of the first DCI and the second DCI includes a frequency domain resource assignment (FDRA), a time domain resource assignment (TDRA), a modulation and coding scheme, a new data indicator, a redundancy version (RV), a hybrid automatic repeat request (HARQ) process identity (ID), or a combination thereof.

10. The method of claim 1, wherein the one or more carriers include a first SUL carrier of the multiple SUL carriers, a second SUL carrier of the multiple SUL carriers, the non-SUL carrier, or a combination thereof.

11. A method of wireless communication performed by a base station, the method comprising:

transmitting, to a user equipment (UE), a carrier set configuration indicating multiple uplink (UL) carriers, the multiple UL carriers including multiple supplemental uplink (SUL) carriers and a non-SUL carrier, wherein the multiple SUL carriers include a primary SUL carrier and one or more secondary SUL carriers;

selecting one or more carriers of the multiple UL carriers;

transmitting a carrier selection indicator indicating one or more carriers of the multiple UL carriers, wherein the carrier selection indicator includes a first DCI associated with a first carrier of the multiple UL carriers and a second DCI associated with a second carrier of the multiple UL carriers; and receiving, from the UE, a channel on each carrier of the one or more carriers.

12. The method of claim 11, further comprising:

receiving a capability message including capability information for the UE; and wherein the capability information indicates carrier capabilities, a concurrent transmission via multiple UL carriers capability, or a combination thereof.

13. The method of claim 11, further comprising:

transmitting a configuration message to the UE; and wherein the configuration message includes a radio resource configuration (RRC) message or layer 1 (L1) downlink control information (DCI) signaling, or the configuration message indicates the carrier set configuration, the carrier selection indicator, or a combination thereof.

14. The method of claim 11, wherein each of the first DCI and the second DCI includes a frequency domain resource assignment (FDRA), a time domain resource assignment (TDRA), a modulation and coding scheme, a new data indicator, a redundancy version (RV), a hybrid automatic repeat request (HARQ) process identity (ID), or a combination thereof.

15. The method of claim 11, wherein:

the one or more carriers include a first SUL carrier of the multiple SUL carrier, a second SUL carrier of the multiple SUL carriers, the non-SUL carrier, or a combination thereof; and the carrier selection indicator is associated with a semi-static configuration or is sent in a grant message in downlink control information (DCI).

16. A user equipment (UE) comprising:

at least one processor; and a memory coupled with the at least one processor and storing processor-readable code that, when executed by the at least one processor, is configured to:

receive, from a base station, a carrier set configuration indicating multiple uplink (UL) carriers, the multiple UL carriers including multiple supplemental uplink (SUL) carriers and a non-SUL carrier, wherein the multiple SUL carriers include a primary SUL carrier and one or more secondary SUL carriers;

receive, from the base station, a carrier selection indicator included in downlink control information (DCI), wherein the carrier selection indicator includes a first DCI associated with a first carrier of the multiple UL carriers and a second DCI associated with a second carrier of the multiple UL carriers select one or more carriers of the multiple UL carriers,
wherein the one or more carriers are selected based
on the carrier selection indicator; and initiate transmission of a channel on each carrier of the
one or more carriers.

17. The UE of claim 16, wherein the channel includes a physical uplink shared channel
(PUSCH).

18. The UE of claim 16, wherein the processor-readable
code, when executed by the at least one processor, is
configured to:

transmit a capability message including capability information; and wherein the capability information indicates carrier capabilities, a concurrent transmission via multiple UL
carriers capability, or a combination thereof.

19. The UE of claim 16, wherein the processor-readable
code, when executed by the at least one processor, is
configured to:

receive, from the base station, a configuration message
that includes the carrier set configuration, the carrier
selection indicator, or a combination thereof, and wherein the configuration message includes a radio
resource configuration (RRC) message or layer 1 (L1)
downlink control information (DCI) signaling.

20. The UE of claim 16, wherein the processor-readable
code, when executed by the at least one processor, is
configured to:

receive, from the base station, the carrier selection indicator included in downlink control information (DCI);
and wherein the one or more carriers are selected based on the
carrier selection indicator.

21. The UE of claim 16, wherein the one or more carriers
include a first SUL carrier of the multiple SUL carriers, a
second SUL carrier of the multiple SUL carriers, the non-
SUL carrier, or a combination thereof.

22. A base station comprising:

at least one processor; and a memory coupled with the at least one processor and
storing processor-readable code that, when executed by
the at least one processor, is configured to:

initiate transmission, to a user equipment (UE), of a
carrier set configuration indicating multiple uplink
(UL) carriers, the multiple UL carriers including
multiple supplemental uplink (SUL) carriers and a
non-SUL carrier, wherein the multiple SUL carriers
include a primary SUL carrier and one or more
secondary SUL carriers;

select one or more carriers of the multiple UL carriers;

transmit a carrier selection indicator indicating one or
more carriers of the multiple UL carriers, wherein
the carrier selection indicator includes a first DCI
associated with a first carrier of the multiple UL
carriers and a second DCI associated with a second
carrier of the multiple UL carriers; and receive, from the UE, a channel on each carrier of the
one or more carriers.

23. The base station of claim 22, wherein the processor-
readable code, when executed by the at least one processor,
is configured to:

receive a capability message including capability information for the UE; and wherein the capability information indicates carrier capabilities, a concurrent transmission via multiple UL
carriers capability, or a combination thereof.

24. The base station of claim 22, wherein the processor-
readable code, when executed by the at least one processor,
is configured to:

transmit a configuration message to the UE; and wherein the configuration message includes a radio
resource configuration (RRC) message or layer 1 (L1)
downlink control information (DCI) signaling, or the configuration message indicates the carrier set configuration, the carrier selection indicator, or a combination thereof.

25. The base station of claim 22, wherein:

the one or more carriers include a first SUL carrier of the
multiple SUL carrier, a second SUL carrier of the
multiple SUL carriers, the non-SUL carrier, or a combination thereof.

* * * * *